United States Patent

[11] 3,590,944

[72] Inventors Victor Millman;
Remo Tontini; Edwin C. Kamps, all of San Diego, Calif.
[21] Appl. No. 817,018
[22] Filed Apr. 17, 1969
[45] Patented July 6, 1971
[73] Assignee Rohr Corporation
Chula Vista, Calif.

[54] METHOD AND APPARATUS FOR SUPPRESSING THE NOISE OF JET-PROPELLED AIRCRAFT
7 Claims, 3 Drawing Figs.

[52] U.S. Cl. ............................................ 181/33 HC,
181/33 HD, 239/127.3, 239/265.13, 239/265.33,
181/33 E
[51] Int. Cl. ............................................ B64d33/06,
B64c 9/38
[50] Field of Search ........................................ 181/43, 51,
33, 64.1, 33.221, 33.222, 33.05, 33.223;
239/127.3, 265.11, 265.13, 265.17, 265.19,
265.23, 265.33

[56] References Cited
UNITED STATES PATENTS
2,930,185 3/1960 Tyler ............................ 239/265.13

| 3,027,710 | 4/1962 | Maytner | 181/33 (.221) |
| 3,067,968 | 12/1962 | Heppenstall | 181/33 (.221) |
| 3,174,282 | 3/1965 | Harrison | 181/33 (.221) |
| 3,495,682 | 2/1970 | Treiber | 181/60 X |

FOREIGN PATENTS

| 1,436,412 | 3/1966 | France | 181/33 (.221) |
| 878,191 | 9/1961 | Great Britain | 181/33 (.222) |
| 1,019,857 | 2/1966 | Great Britain | 239/265.33 |

Primary Examiner—Robert S. Ward, Jr.
Attorney—George E. Pearson

ABSTRACT: A panel of substantially hemicylindrical form is mounted on the engine nacelle of a jet-propelled aircraft with the longitudinal axis of the panel extending axially of the nacelle. The panel is movable axially of the nacelle between a retracted position wherein it is alongside the latter and a deployed position wherein it is disposed downstream from the nacelle and tilted upwardly at an angle relative to the longitudinal axis of the thrust nozzle of the engine contained in the nacelle so as to intercept the expansion boundary of the jet stream issuing from said nozzle several nozzle diameters downstream of the nozzle. Means are provided for moving the panel between its retracted and deployed positions.

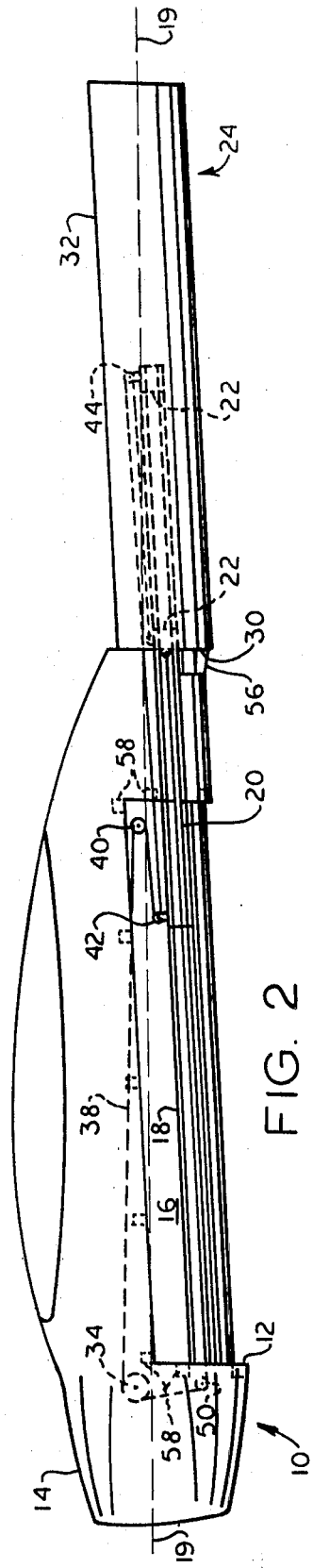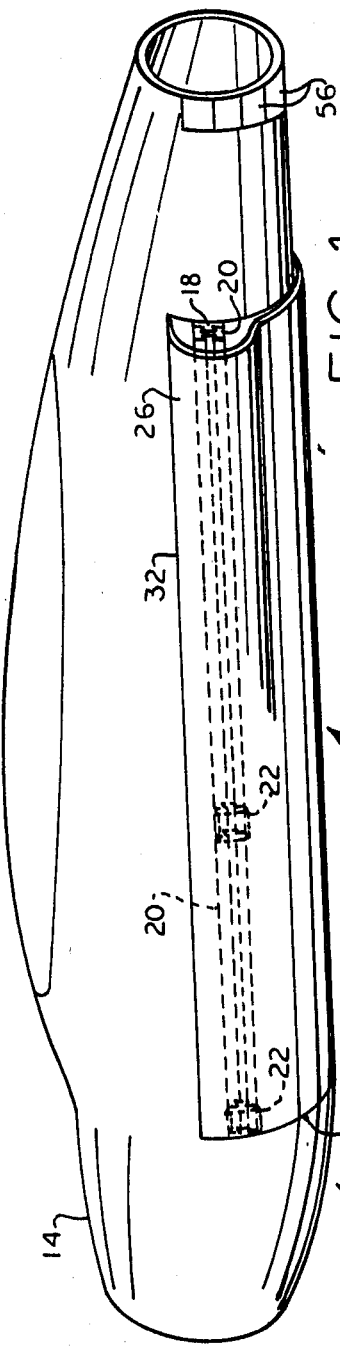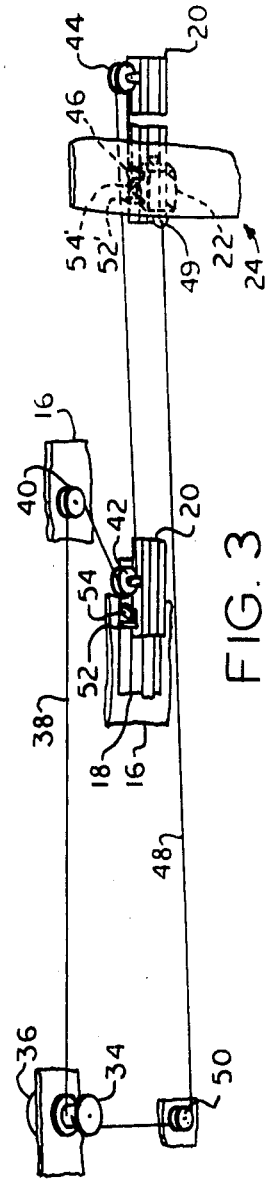

3,590,944

METHOD AND APPARATUS FOR SUPPRESSING THE NOISE OF JET-PROPELLED AIRCRAFT

BACKGROUND OF THE INVENTION

This invention relates to jet-propelled aircraft and, more particularly, to a method and apparatus for effectively reducing the noise of such aircraft.

It is known that much of the noise associated with the operation of an aircraft jet engine emanates from the jet stream discharged from the engine. The invention disclosed herein provides a method and apparatus for substantially reducing the propagation of sound energy associated with such a jet stream, as well as the propagation of sound energy which is e generated within the engine nacelle of a jet-propelled aircraft and which is emitted from the opening in the aft end of said nacelle. A particular advantage of sound suppression apparatus in accordance with the invention is that its working component can be stowed in a streamlined configuration around an engine nacelle of the aircraft when the latter is in high-altitude flight, at which time the noise of a jet stream is attenuated before reaching the earth's surface. Another advantage of apparatus in accordance with the invention is that it adds relatively little weight to an aircraft jet propulsion unit. Furthermore, such apparatus does not materially affect the operation of a jet engine and is economical to make and use.

SUMMARY OF THE INVENTION

In a preferred embodiment of the invention, the middle portion of the periphery of a jet engine nacelle is formed with a shallow recess that extends around the bottom of the nacelle and upwardly along its sides. A first pair of rails (hereinafter referred to as the first rails) are respectively mounted on the sidewalls of this recess and extend longitudinally of the nacelle in parallel relation with each other, these first rails being inclined upwardly in the rearward direction relative to the longitudinal axis of the thrust nozzle of the jet engine contained in the nacelle. A second pair of rails (hereinafter referred to as the second rails) are respectively mounted on the outer sides of the first rails in parallel relation therewith, these second rails being movable along their own longitudinal axes so that they can be positioned alongside the first rails or moved in a rearward direction along the latter to a position wherein the rear portions thereof project beyond the aft end of the nacelle. A pair of mounting blocks are slidably mounted on the outer side of each second rail for movement longitudinally thereof, and a generally hemicylindrical (or trough-shaped) panel is attached along its longitudinal edges to the outer sides of these mounting blocks. Thus the panel can be positioned alongside the nacelle or moved rearwardly to a position wherein it is downstream from the nacelle and intercepts the lower portion of the expansion boundary of the jet stream issuing from the aforesaid thrust nozzle. A cable-and-pulley arrangement moves the panel between its deployed and retracted positions at any selected time. Lastly, means are provided to lock the panel in its stowed position.

OBJECTS OF THE INVENTION

Accordingly, it is a primary object of this invention to provide means for effectively reducing the propagation of sound energy associated with the jet stream of a jet-propelled aircraft.

Another object of the invention is to provide an effective method of reducing the noise of a jet-propelled aircraft without adversely affecting the operating efficiency of the engine or engines thereof.

Still another object is to provide effective sound suppression apparatus for a jet-propelled aircraft without adding excessive weight thereto.

A further object is to provide sound suppression apparatus for a jet-propelled aircraft which is arranged so that the working component thereof can be stowed in a streamlined configuration around an engine nacelle of the aircraft when the latter is in high-altitude flight.

Another object is to reduce the propagation of noise which is generated by a jet engine inside the nacelle of an aircraft.

DESCRIPTION OF THE DRAWINGS

In the drawings:

FIG. 1 is a pictorial view of an engine nacelle of a jet-propelled aircraft provided with sound suppression apparatus in accordance with the present invention, a panel which is the principal component of said apparatus being illustrated in a stowed position in the drawing;

FIG. 2 is a side elevation of the same nacelle, illustrating the aforesaid panel in a deployed position; and FIG. 3 is a diagrammatic representation of the system employed to move the panel between its stowed and deployed positions.

Throughout the drawings and the following specification, the same numbers designate the same parts.

DETAILED DESCRIPTION

Components of a preferred embodiment of this invention are mounted on a jet engine nacelle of the type illustrated in FIGS. 1 and 2 and generally designated therein by the number 10. As can be seen in FIG. 2, the middle portion of nacelle 10 is formed with a shallow recess 12 that extends from outer wall 14 to an inner wall 16 and around the bottom of the nacelle and upwardly along its sides. Fixedly mounted on wall 16 on opposite sides of the nacelle and extending longitudinally there are two rails 18 (only one of which is illustrated). The longitudinal axes of rails 18 are parallel with each other and inclined upwardly in the rearward direction relative to the longitudinal axis 19 of the thrust nozzle of the jet engine disposed within nacelle 10.

Extending lengthwise of the outer side of each rail 18 and projecting laterally therefrom is an integral portion of the rail which has a dovetail cross-sectional form (see FIG. 1). Each of a second pair of rails 20 (only one of which is illustrated) has a slot extending lengthwise of the inner side thereof, which slot has a dovetail cross-sectional form. The aforesaid dovetail portions of rails 18 are respectively disposed within the slots on the inner sides of rails 20 and abut roller bearings (not illustrated) which are mounted within said slots. Thus rails 20 are movable longitudinally on rails 18 while being held in parallel relation therewith.

Each rail 20 is also provided with a dovetail slot which extends lengthwise of the outer side thereof. Illustrated by broken lines in FIGS. 1 and 2 are two of four mounting blocks 22 which are fixedly attached to the inner surface of a substantially hemicylindrical panel, generally designated by the number 24, and pairs of which are spaced apart on opposite sides of the latter. More specifically, two of the mounting bricks are disposed at the forward end of the panel and the other two blocks are disposed near the middle of the panel. A projection having a dovetail cross section extends lengthwise of the outer side (i.e., the side remote from the inner surface of panel 24) of each mounting block 22 and is disposed within the slot in the outer surface of a respective one of the rails 20. Hence panel 24 can be either positioned alongside rails 20 or moved rearwardly thereon to the position illustrated in FIG. 2. The panel is formed with two lobes 26 (only one shown) which project laterally from opposite sides of the aft portion thereof. When the panel is in its forward position illustrated in FIG. 1, its forward edge 30 and longitudinal edges 32 coincide with the forward and longitudinal edges of recess 12 of nacelle 10, respectively.

A pair of drums 34 (only one of which is illustrated, in FIGS. 2 and 3) are situated on opposite sides of nacelle 10 and mounted on the portion of inner wall 16 which is forward of recess 12. Drums 34 can be rotated by drive means 36 (see FIG. 3) attached to the inner side of wall 16, which drive means may be of any suitable type and operate synchronously to rotate the drums in the same direction at the same time. A cable 38 extends from each drum 34 to a pulley 40 mounted on inner wall 16 adjacent the aft edge of recess 12, thence to a pulley 42 mounted on the forward end of the upper edge of the rail 20 attached to the rail 18 adjacent said drum, thence to a pulley 44 mounted on the aft end of said upper edge of rail 20, and finally to a lug 46 fixedly attached to the upper edge of the forward mounting block 22 on the adjacent side of panel 24, the cable being fastened to the lug by suitable means. Each of a pair of cables 48 is also fastened to a respective one of two lugs 49 mounted on the forward edge of panel 24 on opposite sides thereof and extends to a respective one of two pulleys 50 rotatably mounted on the portion of inner wall 16 forward of recess 12 and thence to a respective one of the drums 34. The axis of rotation of the aforesaid drums and pulleys are substantially perpendicular to a vertical plane which passes through the longitudinal axis of nacelle 10, and the two sets of cables 38, 48 are connected to drums 34 so that as cables 38 are wound on the latter cables 48 are unwound therefrom, and vice versa.

Fixedly mounted on the upper edge of each rail 20 and projecting upwardly therefrom is a pin 52, and a stop member 54 is also fixedly mounted on each rail 18 and projects outwardly therefrom so as to engage said pin 52 when the rail 20 is moved rearwardly to a deployed position, thus providing means for limiting the movement of rails 20 rearwardly on rails 18. Pins 52' and stop members 54' are likewise mounted on the forward mounting blocks 22 on panel 24 and on rails 20, respectively, to thereby limit the movement of said panel in the rearward direction on said rails 20.

Disposed around the lower portion of the aft end of nacelle 10 are a plurality of vanes 56 each of which is pivotally connected along its forward edge to the outer wall 14 of the nacelle. When the vanes are in a first retracted position their forward and aft ends are substantially equidistant from the longitudinal axis of the thrust nozzle adjacent thereto. However, actuators of conventional design (such as, for example, hydraulic cylinders) are connected to the vanes in such manner that the aft ends of the latter can be swung outward and into engagement with the inner surface of the forward end of panel 24 when it is deployed to the position illustrated in FIG. 2 (the uppermost vane on each side of the nacelle engages the inner side of the adjacent rail 20). The edges of vanes 56 (excepting the uppermost vanes which contact rails 20 as aforesaid when deployed) are overlapped so that there are no gaps between the vanes in a deployed position. Thus the vanes control the amount of atmospheric air flowing along the inner surface of the lower portion of panel 24 when it is deployed.

Outlined by broken lines in FIG. 2 are a plurality of actuators 58 which are mounted on the inner side of outer wall 14 of nacelle 10 and which can be operated to engage and disengage locking members (not shown) connected thereto with the adjacent edges of panel 24 when it is in the forward position.

OPERATION

When the above-described apparatus is to be deployed to an operative configuration to suppress the noise of a jet-propelled aircraft provided therewith, actuators 58 are operated to disengage from panel 24 the locking members connected to said actuators, and drive means 36 are next operated to wind cables 38 on drums 34, cables 48 being simultaneously unwound therefrom. Thus rails 20 are pulled rearwardly along rails 18 until pins 52 contact stop members 54, and panel 24 is pulled rearwardly on rails 20 until pins 52' contact stop members 54'. The operation of drive means 36 is then stopped by suitable means such as limit switches, and vanes 56 are rotated outwardly by the actuators associated therewith to engage the aft ends thereof with the inner sides of rails 20 and the inner surface of the forward end of panel 24, respectively.

The jet stream issuing from the thrust nozzle in the aft portion of nacelle 10 expands after leaving the nozzle, and its expansion boundary contacts the inner surface of panel 24. It has been found that panel 24, when in the intercept position, effectively reduces the noise which is associated with the jet stream of a jet engine and which normally travels downwardly from said jet stream and also laterally therefrom. In addition, the panel reduces the propagation in the same directions of noise which is generated by the jet engine within the nacelle and which is emitted from the opening in the aft end of the latter. It has also been found that the noise attenuation resulting from impingement of the expansion boundary of the jet stream on panel 24 depends on the angle at which the panel is positioned relative to the jet stream. Although this angle varies in accordance with such factors as the configuration of the nozzle and the length of the panel and its proximity to the nozzle exit and the jet boundary, tests indicate that the longitudinal axis of the panel preferably should be tilted upwardly between 3° to 6° relative to the longitudinal axis of the jet stream to provide proper impingement of said jet stream on the panel. Preferably the length of the panel extending beyond the aft end of nacelle 10 should be between four to six times the exit diameter of the thrust nozzle. However, the length of the panel may be greater than six times the nozzle exit diameter if desired. In tests employing a convoluted nozzle, a panel projecting beyond the end of the nozzle for a distance equal to six times its exit diameter and covering 180° of the exposed nozzle area, and with the panel disposed at an angle of 5° upward relative to the axis of the nozzle, a sound reduction of 8.0 db. in perceived noise level was attained at calculated full scale distance of 200 feet in the downward direction. Furthermore, a sound reduction of approximately 5.0 db. in perceived noise level was also achieved in the horizontal plane at the same distance from the panel (i.e., at a point on a side line normal to the panel and 200 feet from the latter).

Thus it will be apparent that the invention provides effective means for reducing the noise of a jet-propelled aircraft, either while such aircraft is on the ground or in flight. When a jet-propelled aircraft is at cruise altitude the sound energy of its jet stream, or streams, is of course attenuated before reaching ground level. Hence panel 24 can then be placed in a stowed position around nacelle 10. This retraction of the panel can readily be effected by rotating drums 34 to wind cables 48 thereon (and to unwind cables 38 therefrom). After the panel reaches the stowed position it is locked in place by means of actuators 58 and the locking members associated therewith.

Although this invention has been described with reference to a particular embodiment of the same, it should not be considered to be limited thereto for various modifications could be made therein by one having ordinary skill in the art without departing from the spirit and scope of the invention as defined in the following claims. For example, although in the embodiment of the invention which has been described and illustrated the panel 24 is mounted on an engine nacelle 10 of a jet-propelled aircraft, the panel can also be mounted on the fuselage of such an aircraft, the only requirement being that the panel be mounted so that it can be deployed to a position wherein it intercepts the expansion boundary of the jet stream issuing from a jet engine of the aircraft.

What we claim and desire to be secured by U.S. Letters Patent is:

1. A method of suppressing the noise associated with the jet stream issuing from the nozzle of a jet-propelled aircraft which comprises positioning a panel of hemicylindrical form at a predetermined angle which extends rearwardly and upwardly relative to the longitudinal axis of said nozzle of said jet engine and downstream from the aft end thereof to intercept the expansion boundary of said jet stream from four to six nozzle diameters downstream from said aft end of the nozzle.

2. Apparatus as defined in claim 1 wherein said predetermined angle is between 3 to 6°.

3. In combination with an aircraft propelled by a jet engine, sound-suppressing apparatus comprising an elongate panel of hemicylindrical form mounted on said aircraft for movement between a first position wherein said panel is disposed in a stowed position relative to said aircraft and a second position wherein said panel is disposed in a deployed position relative to said aircraft and is situated at a predetermined angle which extends rearwardly and upwardly relative to the longitudinal axis of the thrust nozzle of said jet engine so as to intercept the expansion boundary of the jet stream issuing from said thrust nozzle from four to six nozzle diameters downstream of the aft end of the nozzle, and means on said aircraft for returning said panel to said first position after it has been moved to said second position thereof.

4. Apparatus as defined in claim 3 including means on said aircraft for moving said panel from said first position to said second position thereof.

5. Apparatus as defined in claim 4 wherein said engine is enclosed in a nacelle and said panel conforms with the shape of the latter.

6. Apparatus as defined in claim 5 wherein said panel is slidably mounted on a pair of parallel rails which are attached to opposite sides of said nacelle and which extend longitudinally thereof.

7. In combination with an aircraft propelled by a jet engine, sound-suppressing apparatus comprising an elongate panel mounted on said aircraft for movement between a first position wherein said panel is disposed in a stowed position relative to said aircraft and a second position wherein said panel is disposed in a a deployed position relative to said aircraft and is situated at a predetermined angle relative to the longitudinal axis of the thrust nozzle of said jet engine so as to intercept the expansion boundary of the jet stream issuing from said thrust nozzle, means on said aircraft for returning said panel to said first position after it has been moved to said second position thereof, a nacelle enclosing said engine, said panel conforming to the shape of said nacelle, a plurality of vanes disposed in overlapped relation around the aft end of said nacelle and pivotally connected at their forward ends to the wall thereof, said vanes being rotatable between a first position wherein their forward and aft ends are substantially equidistant from the longitudinal axis of said nacelle and a second position wherein the aft ends thereof are swung outwardly relative to said nacelle to thereby control atmospheric air which flows through the gap between the nacelle and said panel when the latter is in said second position thereof.